(12) United States Patent
Takahashi (10) Patent No.: US 7,218,675 B1
(45) Date of Patent: May 15, 2007

(54) SIGNAL PROCESSING DEVICE (75) Inventor: Koji Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/279,077

(22) Filed: Jul. 22, 1994

Related U.S. Application Data (63) Continuation of application No. 07/900,945, filed on Jun. 17, 1992, now abandoned.

(30) Foreign Application Priority Data

Jun. 24, 1991 (JP) .................................. 3-151629

(51) Int. Cl.
  *H04B 1/66* (2006.01)
  *H04N 7/12* (2006.01)
  *H04N 11/02* (2006.01)
  *H04N 11/04* (2006.01)

(52) U.S. Cl. .............. 375/240.16; 348/155; 348/208.1; 348/208.4; 382/236

(58) Field of Classification Search .................. 382/56, 382/42, 255; 358/135, 136, 222; 354/70; 359/554; 348/208, 394, 409, 412, 413, 415, 348/416, 208.99, 208.4–208.6, 208.12, 208.13; 375/240.12, 240.13, 240.16, 240.17
See application file for complete search history.

(56) References Cited

U.S. PATENT DOCUMENTS

| | | | | |
|---|---|---|---|---|
| 4,460,923 A | * | 7/1984 | Hirano et al. ............ | 348/413.1 |
| 4,668,987 A | * | 5/1987 | Matsuda et al. ............ | 358/136 |
| 4,670,851 A | * | 6/1987 | Murakami et al. .......... | 364/518 |
| 4,691,230 A | * | 9/1987 | Kaneko et al. | |
| 4,709,264 A | * | 11/1987 | Tamura et al. .............. | 358/222 |
| 4,717,958 A | * | 1/1988 | Gal et al. ................. | 348/208.6 |
| 4,769,826 A | | 9/1988 | Kubo et al. ................. | 375/122 |
| 4,837,632 A | * | 6/1989 | Kubo et al. ................. | 348/208 |
| 5,006,929 A | * | 4/1991 | Barbero et al. ............. | 358/136 |
| 5,012,270 A | * | 4/1991 | Sekine et al. ............... | 358/222 |

(Continued)

FOREIGN PATENT DOCUMENTS

JP        60-163594        8/1985

(Continued)

OTHER PUBLICATIONS

Derwent abstract, JP-02305287, Dec. 1990.*

(Continued)

*Primary Examiner*—Jean B. Corrielus
(74) *Attorney, Agent, or Firm*—Fitzpatrick, Cella, Harper & Scinto (57) ABSTRACT

An image signal processing apparatus includes an inputting unit, an electrical image stabilizing unit, and a compression encoding unit. The inputting unit is arranged to input an image signal representing a sequence of images of a subject produced by an image sensing unit. The electrical image stabilizing unit is arranged to detect unintentional movement of the image caused by shaking of an image sensor unit on the basis of the image signal and to correct the image signal, after the input signal is input by the input unit, by removing the effect of the unintentional movement, so as to yield a corrected sequence of images in which a position of the subject is stabilized. The compression encoding unit is arranged to interpicture encode the image signal stabilized by the electrical image stabilizing unit.

11 Claims, 5 Drawing Sheets

U.S. PATENT DOCUMENTS

| | | | |
|---|---|---|---|
| 5,032,927 A | | 7/1991 | Watanabe et al. ............ 358/335 |
| 5,068,724 A | * | 11/1991 | Krause et al. .......... 375/240.16 |
| 5,099,323 A | * | 3/1992 | Morimura et al. ...... 348/207.99 |
| 5,105,271 A | * | 4/1992 | Niihara ....................... 358/133 |
| 5,124,790 A | * | 6/1992 | Nakayama .................. 358/133 |
| 5,136,371 A | * | 8/1992 | Savatier et al. ......... 375/240.05 |
| 5,144,426 A | * | 9/1992 | Tanaka et al. ............... 348/416 |
| 5,157,742 A | * | 10/1992 | Niihara ....................... 358/136 |
| 5,172,226 A | * | 12/1992 | Morimura et al. ...... 348/207.99 |
| 5,184,216 A | * | 2/1993 | Kobayashi .................. 358/105 |
| 5,189,518 A | * | 2/1993 | Nishida ....................... 358/222 |
| 5,191,414 A | * | 3/1993 | Sugiyama |
| 5,204,741 A | * | 4/1993 | Sakaguchi ............... 348/208.6 |
| 5,227,889 A | * | 7/1993 | Yoneyama et al. ...... 348/208.6 |
| 5,296,925 A | * | 3/1994 | Kondo et al. ............... 348/208 |
| 5,379,063 A | * | 1/1995 | Kishi et al. .............. 348/208.6 |
| 5,384,595 A | * | 1/1995 | Sakaguchi ............. 348/208.99 |
| 5,386,264 A | * | 1/1995 | Sekine et al. ................ 354/430 |
| 5,389,918 A | * | 2/1995 | Kusaka et al. .............. 348/699 |
| 5,416,557 A | * | 5/1995 | Nagasaki et al. |
| 5,450,126 A | * | 9/1995 | Nishida ....................... 348/208 |
| 5,452,021 A | * | 9/1995 | Kusaka et al. .............. 348/699 |
| 5,561,485 A | * | 10/1996 | Hamada et al. |
| 5,585,843 A | * | 12/1996 | Ishizuka et al. ............. 348/208 |
| 5,596,366 A | * | 1/1997 | Takashima et al. .... 348/208.16 |
| 5,647,049 A | * | 7/1997 | Odaka et al. ................ 386/124 |
| 5,729,290 A | * | 3/1998 | Tokumitsu et al. ......... 348/349 |

FOREIGN PATENT DOCUMENTS

| | | | |
|---|---|---|---|
| JP | 1 109970 | | 4/1989 |
| JP | 1 125068 | | 5/1989 |
| JP | 01-174076 | | 7/1989 |
| JP | 01-192288 | | 8/1989 |
| JP | 01-241991 | | 9/1989 |
| JP | 1 227287 | | 11/1989 |
| JP | 2 079585 | | 3/1990 |
| JP | 02-171093 | | 7/1990 |
| JP | 02305287 | * | 12/1990 |
| JP | 03-001669 | | 1/1991 |
| JP | 03-026080 | | 2/1991 |
| JP | 3 096931 | | 4/1991 |
| JP | 03-117278 | | 5/1991 |
| WO | WO9000334 | | 1/1990 |

OTHER PUBLICATIONS

Signal Processing Image Communication, vol. 2, No. 2, Aug. 1990, Amsterdam, pp. 187-189, "A low bit rate coding algorithm for full motion video signal", M. Haghiri & P. Denoyelle.

Conference COMPCON Spring '91, Feb. 25-Mar. 1, 1991, San Francisco, CA., "The MPEG video compression standard", Le Gall D.J.

* cited by examiner

SIGNAL PROCESSING DEVICE

This application is a continuation of application Ser. No. 07/900,945, filed Jun. 17, 1992, now abandoned.

BACKGROUND OF THE INVENTION

1. Field of the Invention

This invention relates to a signal processing device, and more particularly, to compression processing of image signals.

2. Description of the Related Art

Recently, so-called digital VCRs (video cassette recorders) have been considered in which digital signal processing of image signals of so-called VCR's is performed using magnetic tape having a width of ½ inches or 8 millimeters for recording moving-image signals.

The digital VCR performs various kinds of image processing using correlation between image in time. One example of such processing is frame correlation image compression processing which uses correlation between images in time.

Figure 5:
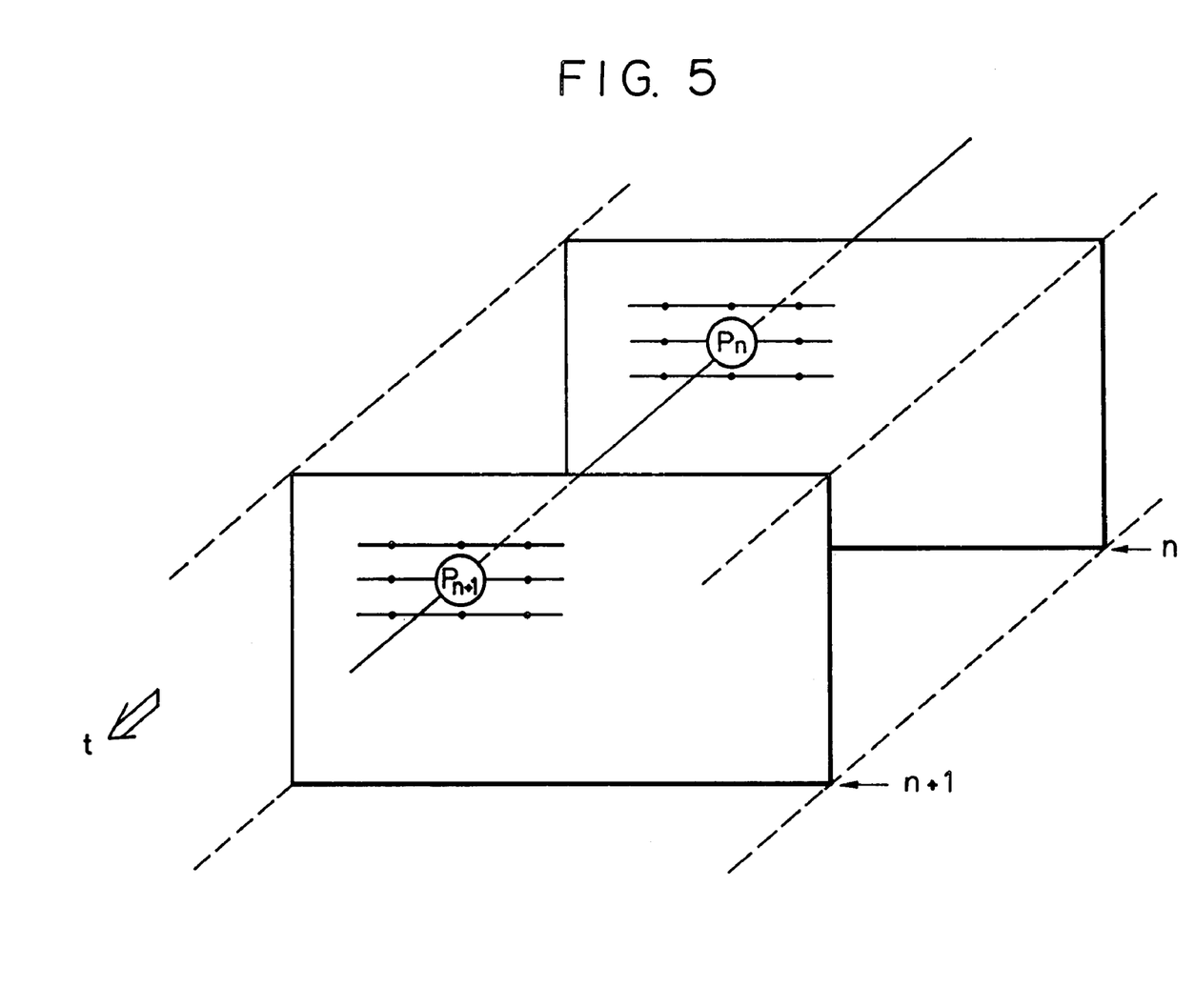
FIG. 5 is a schematic diagram illustrating image compression according to a time-base correlation method.

FIG. 5 is a diagram showing the principle of the frame correlation image compression processing.

In FIG. 5, there are shown a picture frame n, and a picture frame n+1 immediately succeeding the picture frame n in time as indicated by arrow t. FIG. 5 illustrates a case in which a coded pixel (picture element) $P_{n+1}$ of the next picture frame n+1 is subjected to interframe encoding based on a target pixel of $P_n$ of the picture frame n.

The processing is based on the premise (an assumption) that there is strong correlation between immediately successive picture frames of a moving-image signal, and basically, pixel data at the same position in adjacent frames have substantially the same value.

If encoding is performed according to simple interframe prediction, only the difference between the pixels $P_n$ and $P_{n+1}$, the variance in the image deviation from the above-described premise, is encoded. Hence, it is possible to reduce the amount of data by a method, such as nonlinear quantization or the like, which is similar to one-dimensional DPCM (differential pulse-code modulation).

Such a method compresses the data so that, for example, only transmission of information of "the same as the preceding frame" suffices in the case of a perfectly still picture on the assumption that correlation increases as the values of pixel data of succeeding frames are closer.

However, when correlation between images is low, data corresponding to the predicted error from a predicted correlation value must be transmitted. Hence, when the entire picture frame has much movement, it is possible to temporarily generate a large amount of data.

Accordingly, in the case of a portable image recording apparatus provided with the above-described digital signal processing system, various kinds of image processing using time-base correlation between images cannot be effectively performed due to displacement of picture frames caused by unintended hand movement.

SUMMARY OF THE INVENTION

The present invention has been made in consideration of the problems of the prior art.

It is an object of the present invention to provide a signal processing device which can efficiently perform various kinds of image processing using time-base correlation of images.

This object is accomplished, according to one aspect of the present invention, by a signal processing device comprising an image displacement corrector that removes image displacement in an image signal, and a compression unit that compresses the image signal output from the image displacement corrector.

Other objects and advantages of the invention will become apparent from the following detailed description taken in conjunction with the accompanying drawings.

DETAILED DESCRIPTION OF THE PREFERRED EMBODIMENTS

A signal processing device illustrating a signal processing unit provided within an image pickup apparatus including an image pickup means will now be explained.

An image pickup apparatus according to a first embodiment of the present invention will be explained in detail with reference to FIGS. 1–3.

Figure 1:
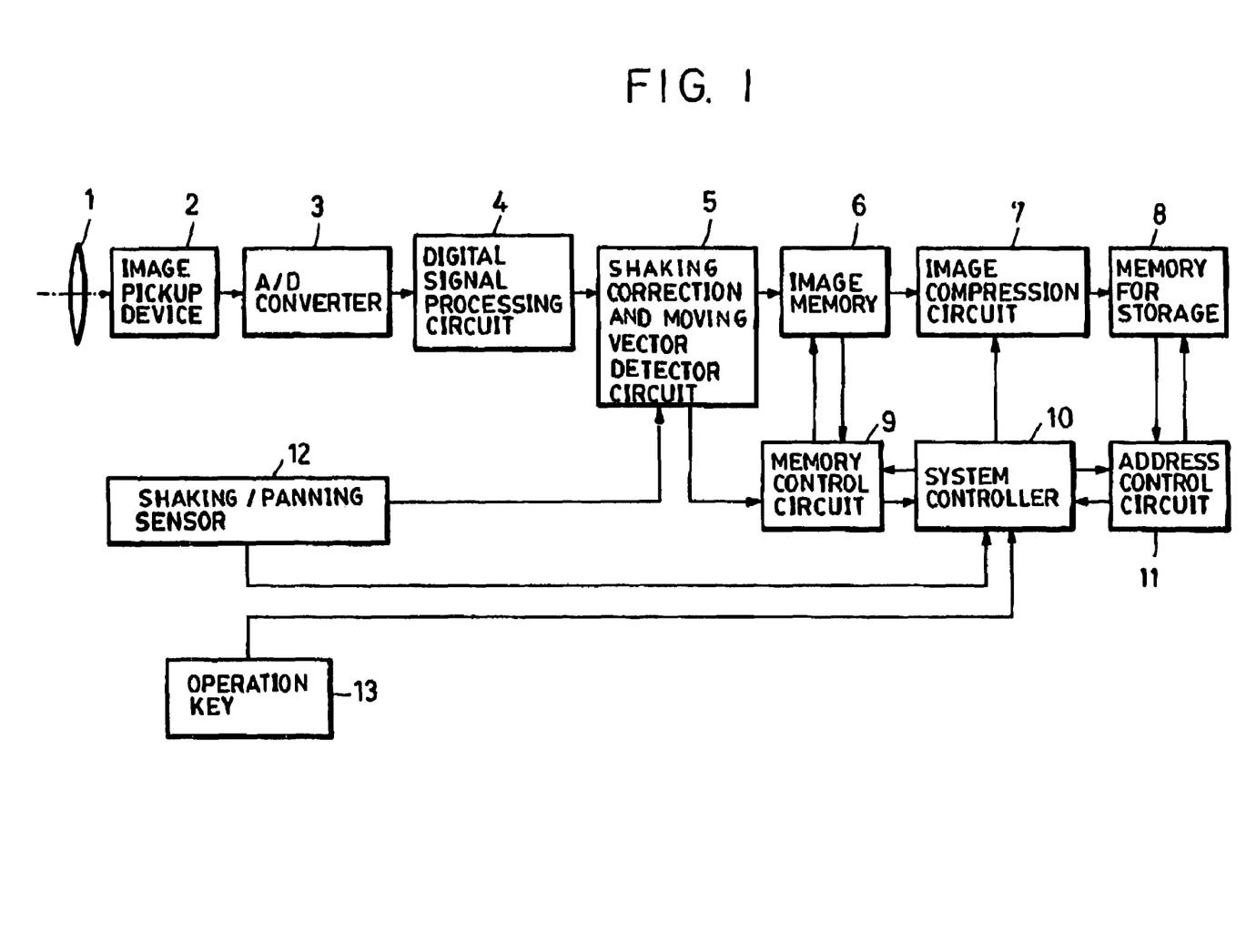
FIG. 1 is a block diagram of an image pickup apparatus according to a first embodiment of the present invention.

FIG. 1 is a block diagram of the image pickup apparatus of the present embodiment. FIGS. 2(a) and 2(b) are diagrams illustrating shaking correction. FIG. 3 is a diagram illustrating a picture surface for displaying image information.

In FIG. 1, there are shown an imaging optical system 1, and a solid-state image pickup device 2, such as a CCD (charge-coupled device) or the like. Incident light of a photographed image from the imaging optical system 1 is directed to the solid-state image pickup device 2, and is subjected to photoelectric conversion, whereby an image signal is obtained.

An A/D converter 3 converts the image signal into a digital image signal. A digital signal processing circuit (DSP circuit) 4 performs well-known video camera signal processing, such as y-conversion, knee-characteristic processing, color balance adjustment or the like.

A shaking correction circuit 5 corrects shaking of the picture surface. An image memory 6 temporarily stores an image signal for at least one image field. There are also shown an image compression circuit 7, and a memory 8 for storing image signals. A memory control circuit 9 controls reading of stored image signals. A microcomputer 10 for controlling the system (hereinafter termed a system controller) controls the image compression circuit 7, the memory control circuit 9, an address control circuit 11 (to be described below) and the like.

The address control circuit 11 controls storing of image signals in the memory 8. A shaking/panning sensor 12 detects panning which is frequently used in camera work and operation key 13 are also shown in FIG. 1.

An explanation will now be provided of the signal processing operations until storage of an image by the image pickup apparatus having the above-described configuration.

A photographed optical image from the imaging optical system 1 is focused on the image pickup device 2. The focused optical image is converted into an electrical image signal by the image pickup device 2. The image signal is converted into a digital image signal by the A/D converter 3, and is input to the DSP circuit 4, in which predetermined signal processing is performed. The image signal output from the DSP circuit 4 is input to the shaking correction circuit 5, in which shaking of the photographed image is corrected.

The operation of the shaking correction circuit 5 will be more specifically explained with reference to FIGS. 2(*a*) and 2(*b*).

Figure 2A:
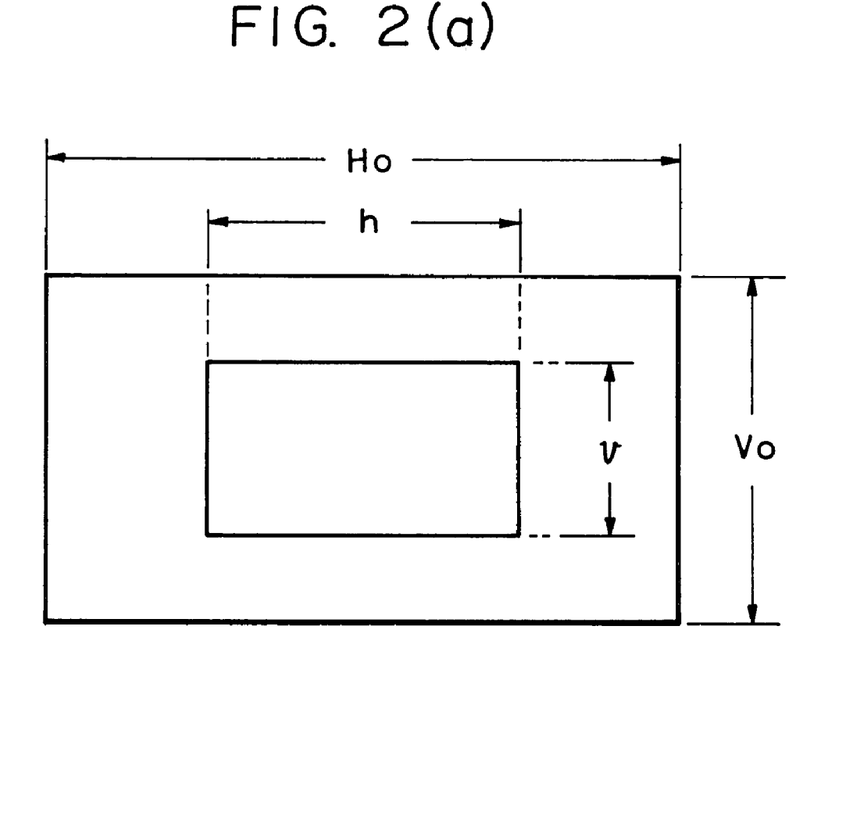
FIGS. 2(a) and 2(b) are diagrams illustrating correction of shaking according to the first embodiment.

As shown in FIG. 2(*a*), a photographed picture frame having a size of $H_o \times V_o$ which has allowance in both the horizontal and vertical directions relative to a substantially effective picture frame having a size of h×v (horizontal width×vertical width) is set, and is first stored in the image memory 6.

Figure 2B:
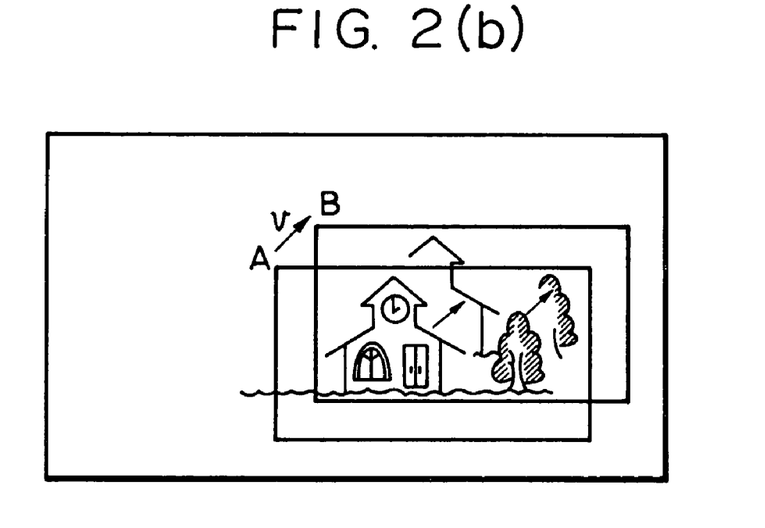

As shown in FIG. 2(*b*), cutting of an effective picture frame so as to cancel shaking of an image is realized by controlling the setting of a memory address. That is, the shaking correction circuit 5 includes a circuit for detecting a moving vector of an image signal, and detects a moving vector corresponding to shaking of the picture frame generated by unintended hand movement. Thus, the shaking correction circuit serves as an electrical stabilizing unit to stabilize the picture frame electrically.

In the example shown in FIG. 2(*b*), movement from point A to point B between adjacent frames is detected, and a moving vector v is input to the memory control circuit 9. The memory control circuit 9 changes the read address so as to cancel the influence of the moving vector v.

If it is assumed that point $P_n$ to start reading of image data at the upper left position of picture frame n is $P_n(X, Y) = (X_n, Y_n)$, and that the moving vector v is $v(X, Y) = (X_v, Y_v)$, point $P_{n+1}$ to start reading of data on picture frame n+1 is set as $P_{n+1}(X, Y) = (X_n + X_v, Y_n + Y_v)$.

By thus controlling the memory address, an image signal in which shaking of the picture frame due to unintended hand movement is removed is obtained from the image memory 6.

In the stabilized image signal obtained as described above, correlation in the direction of the time base is high. The above-described image signal is subjected to data compression processing including time-base correlation processing by the image compression circuit 7 to reduce the amount of image data, and is then stored in the large-capacity solid-state memory 8.

As is well known in the art, the highly correlated image signal obtained by removing motion with the motion vector is more easily compressed so that the overall compression of the image signal is significantly improved.

By appropriately combining the above-described interframe correlation processing using temporal correlation between images, moving-vector compensation for reducing deterioration in picture quality in the interframe correlation processing, two sided predictive interframe compression in which interframe compression is performed for time periods before and after (past and future) the present time on time base, and the like, it is possible to reduce the amount of data of a digital image signal to about a fraction of a few tenths to a few hundredths of the original amount.

More specifically, according to the JPEG (Joint Photographic Expert Group) method in which encoding is performed by DCT (discrete cosine transform) in units of a block comprising (8×8) pixels, or the so-called MPEG-1 which is an algorithm proposed by the MPEG (Moving Picture Expert Group), standard picture quality substantially equivalent to that of a so-called ½-inch VCR can be obtained.

The above-described compression and storage processing is performed by operating the system controller 10 and the address control circuit 11 controlled by the system controller 10 through the operation key 13.

By further adding the shaking/panning sensor 12 in which the movement of the main body of the camera is detected by external sensors, shaking correction and image compression processing can be more efficiently performed. The shaking/panning sensor 12 comprises a plurality of one-dimensional sensors, such as accelerometers or the like, which constitute necessary detecting axes. For example, when panning which is frequently used in camera work is detected, panning information (direction, speed, timing and the like) is transmitted from the one-dimensional sensor in the horizontal direction of the shaking/panning sensor 12 to the shaking correction circuit 5 and the system controller 10.

The shaking correction circuit 5 which has received the panning information can prevent unnatural processing at the start and end of panning by interrupting correction in the panning direction during a panning operation.

Correlation processing in the horizontal direction can be properly executed according to the panning information transmitted to the compression circuit 7 via the system controller 10, whereby compression processing is optimized.

Figure 3:
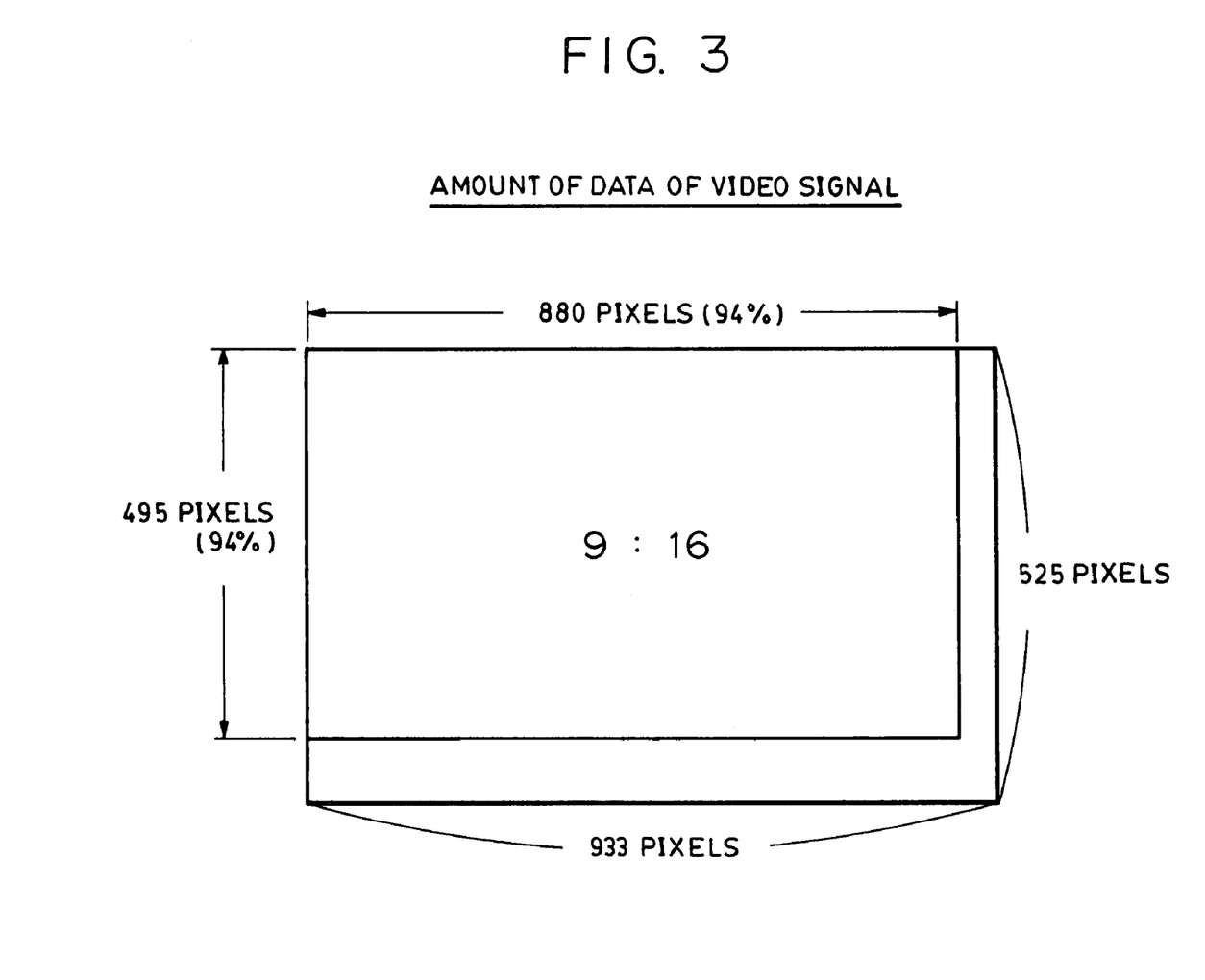
FIG. 3 is a diagram illustrating a picture surface for displaying image information according to the first embodiment.

FIG. 3 illustrates a picture surface for displaying image information.

In the present embodiment, based on a TV signal of the NTSC system (525 scanning lines), a TV signal having an aspect ratio (9:16) of the image which is close to that of a movie is provided as an input signal. If the effective ration of the picture surface is assumed to be 94% both in the vertical and horizontal directions, information of (495×880) pixels for 30 picture frames is generated per second, and is supplied to the A/D converter 3.

The composite image signal input to the A/D converter 3 is converted into a digital signal, and is subjected to video signal processing of components (for example, Y:(R−Y):(B−Y)=4:2:2) by the DSP circuit 4 whenever necessary. If luminance (Y) and color difference are quantized with 8 bit quantization at a sampling rate of ½, information of about 700 G (giga) bits is obtained per hour.

If a stereo sound signal is digitized at 48 kHz (kilohertz)/16 bits, information of about 5.5 G bits per hour is obtained. If the above-described compression processing is performed for these signals, information of about 4 G bits is obtained for the entire AV (audio-visual) signal.

Figure 4:
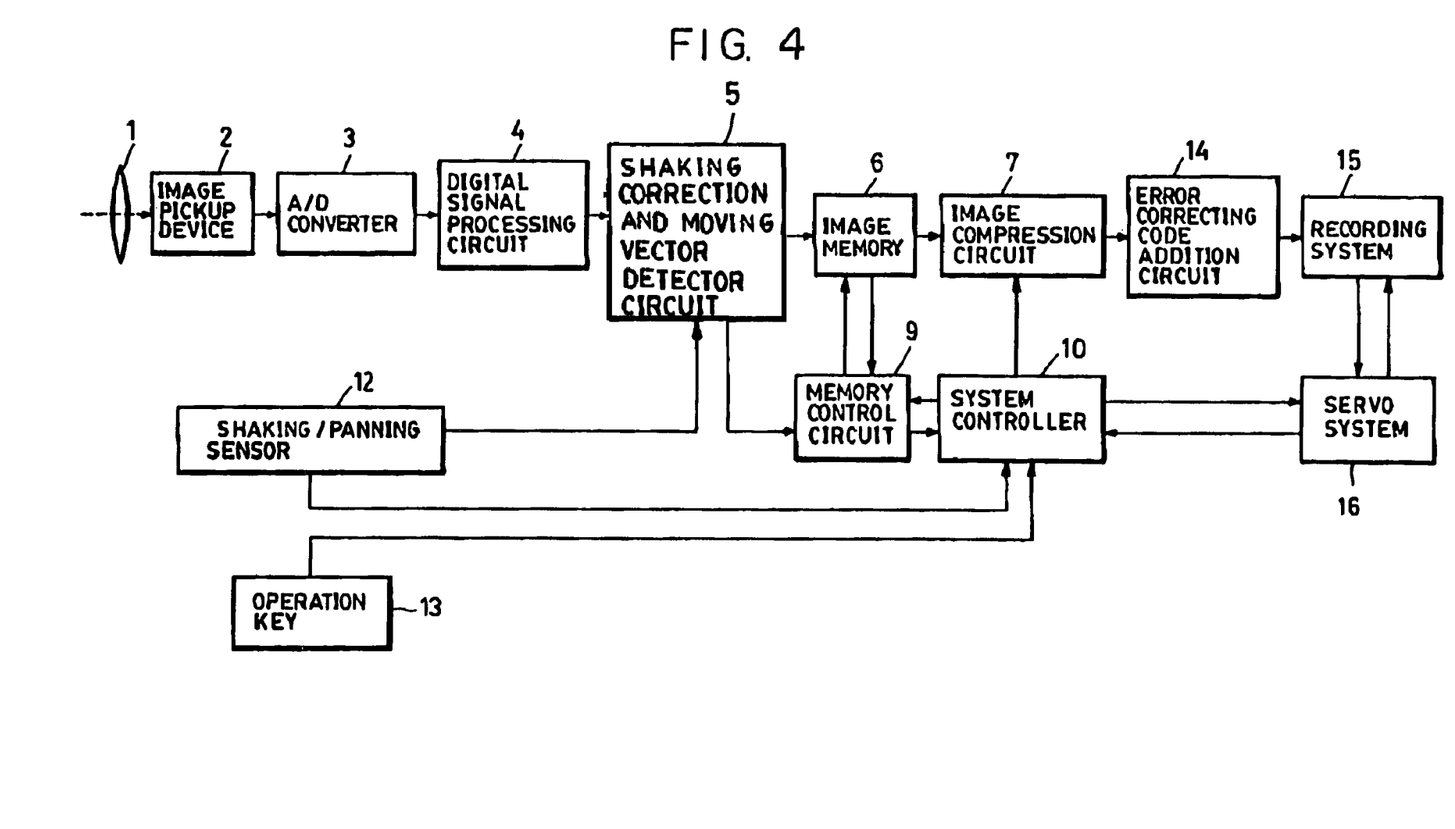
FIG. 4 is a block diagram of an image pickup apparatus according to a second embodiment of the present invention.

Next, an explanation will be provided of an image pickup apparatus according to a second embodiment of the present invention with reference to FIG. 4.

FIG. 4 is a block diagram of the image pickup apparatus of the second present embodiment. In FIG. 4, the same components as in FIG. 1 are indicated by the same reference numerals, and explanation thereof will be omitted.

In FIG. 4, an error correcting code adding circuit 14 corrects erroneous codes in a digital image signal output from the image compression circuit 7. A recording system 15 uses media, such as magnetooptical or other disks, digital VCR tapes or the like. A servo system 16 mechanically controls the recording system 15.

That is, in the second embodiment, an image pickup apparatus which does not employ a solid-state memory is used, the same components as in the first embodiment are used except the above-described three components are added, and the same image signal processing as in the first embodiment is performed.

As explained above in detail, since the signal processing device of the present invention performs time-base correlation processing of image data compression after removing shaking in an image signal and correlation between images is increased, it is possible to increase the efficiency of data in data compression.

More particularly, the present invention is expected to largely remove the influence of hand movement likely to be produced when a small portable image pickup apparatus is used.

By having a configuration of processing photographed information in the form of digital signals and recording the signals whenever necessary, the present invention can also prevent a reduction in the quality of information and reliability during a retrieving or copying operation.

Various changes and modifications may be made without departing from the spirit and scope of the invention.

For example, although in the above-described embodiments, the moving vector of an image signal is detected between adjacent frames, the moving vector of an image signal may be detected between adjacent fields.

In other words, the foregoing description of the embodiments has been given for illustrative purposes only and is not to be construed as imposing any limitation in every respect.

The scope of invention is, therefore, to be determined solely by the following claims and not limited by the text of the specification and alterations that may be made within the scope of the claims fall within the true spirit and scope of the invention.

What is claimed is:

1. An image signal processing apparatus for use with a video camera, comprising:
    a unit having an inputting section arranged to input an image signal representing a sequence of images of a subject produced by an image sensing unit;
    an electrical image stabilizing unit arranged to detect movement in the image signal caused by shaking of the image sensing unit and to correct the movement in the image signal by removing the effect of the movement, so as to output a corrected sequence of images in which a position of the subject is stabilized;
    a sensor unit arranged to detect the occurrence of panning of the video camera and to determine corresponding panning information; and
    a compression encoding unit arranged to encode the corrected image signal output by the electrical image stabilizing unit by applying interframe predictive encoding,
    wherein in a case where panning of the video camera is detected by the sensor unit, the electrical image stabilizing unit interrupts correction of movement in the image signal based on the panning information and the compression encoding unit encodes the corrected image signal based on the panning information,
    and wherein said interframe predictive encoding uses a target image in the corrected sequence of images, and a predicted image based on an image previous to the target image in the corrected sequence of images.

2. An apparatus according to claim 1, wherein said compression encoding unit executes a motion compensation predictive coding.

3. An apparatus according to claim 1, wherein said electrical image stabilizing unit includes a moving vector detector arranged to detect a moving vector of the image signal.

4. An apparatus according to claim 1, wherein said electrical image stabilizing unit includes a moving vector detector arranged to detect a moving vector of the image signal;
    a memory arranged to store the input image signal; and
    a memory controller arranged to read the stored image signal by changing an address of said memory in accordance with the moving vector detected by said moving vector detector.

5. An apparatus according to claim 4, wherein said moving vector detector is arranged to obtain the moving vector by comparing a same element of two images of the sequence of the image signal.

6. An apparatus according to claim 4, wherein said memory controller is controlled in accordance with an output of said electrical image stabilizing unit.

7. A method for use with a video camera, said method for processing an image signal produced by an image sensing unit, the image signal representing a sequence of images of a subject, the image sensing unit being part of a unit having an input section arranged to input the image signal, said method comprising the steps of:
    detecting movement in the image signal caused by shaking of the image sensing unit;
    correcting the movement in the image signal by removing an effect of the movement, so as to output a corrected sequence of images in which a position of the subject is stabilized;
    detecting the occurrence of panning of the video camera; and
    encoding the corrected image signal which is output in the correcting step and in which the effect of the movement is removed, by applying interframe predictive encoding,
    wherein in a case where panning of the video camera is detected the step of detecting the occurrence of panning, the step of detecting the occurrence of panning further determines corresponding panning information, the correcting step interrupts correction of movement in the image signal based on the panning information, and the encoding step encodes the corrected image signal based on the panning information,
    and wherein said interframe predictive encoding uses a target image in the corrected sequence of images, and a predicted image based on an image previous to the target image in the corrected sequence of images.

8. An apparatus according to claim 1, further comprising a recording unit arranged to record, on a recording medium, the image signal interpicture encoded by said compression encoding unit.

9. An apparatus according to claim 2, wherein said compression encoding unit performs coding in conformity with MPEG.

10. An apparatus according to claim 1, wherein decompression of the encoded image signal yields the corrected image signal, the corrected image signal corresponding to the corrected sequence of images in which the position of the subject is stabilized.

11. A method according to claim 7, wherein decompression of the encoded image signal yields the corrected image signal, the corrected image signal corresponding to the corrected sequence of images in which the position of the subject is stabilized.

* * * * *

UNITED STATES PATENT AND TRADEMARK OFFICE
CERTIFICATE OF CORRECTION

PATENT NO. : 7,218,675 B1  
APPLICATION NO. : 08/279077  
DATED : May 15, 2007  
INVENTOR(S) : Takahashi

Page 1 of 1

It is certified that error appears in the above-identified patent and that said Letters Patent is hereby corrected as shown below:

COLUMN 4:  
Line 42, "ration" should read -- ratio --.

Signed and Sealed this

Twenty-second Day of September, 2009

David J. Kappos  
*Director of the United States Patent and Trademark Office*